United States Patent [19]

Riemer et al.

[11] Patent Number: 6,033,579

[45] Date of Patent: Mar. 7, 2000

[54] RED MUD DEWATERING AND WASHING PROCESS

[75] Inventors: Hubert Riemer, St. Oswald, Austria; Nils Oeberg, Oberengstringen, Switzerland; Heinz Perchthaler, Graz, Austria; Paolo Murgia, Villacidro, Italy; Mario Noriega, Bolivar, Venezuela

[73] Assignee: Andritz-Patentverwaltungs-Gesellschaft m.b.H, Graz, Australia

[21] Appl. No.: 08/817,207

[22] PCT Filed: Oct. 12, 1995

[86] PCT No.: PCT/EP95/04021

§ 371 Date: Oct. 16, 1997

§ 102(e) Date: Oct. 16, 1997

[87] PCT Pub. No.: WO96/11737

PCT Pub. Date: Apr. 25, 1996

[30] Foreign Application Priority Data

Oct. 14, 1994 [AT] Austria ..................................... 1943/94

[51] Int. Cl.[7] ............................. B01D 37/00; B01D 33/21
[52] U.S. Cl. ......................... 210/772; 210/774; 210/780; 210/331; 210/398; 75/753
[58] Field of Search ..................................... 210/767, 768, 210/770, 772, 331, 398, 780, 774; 75/753

[56] References Cited

U.S. PATENT DOCUMENTS

| | | |
|---|---|---|
| 3,776,717 | 12/1973 | Kapolyi et al. . |
| 3,876,749 | 4/1975 | Horvath et al. . |
| 3,989,513 | 11/1976 | Dobos et al. . |
| 4,119,698 | 10/1978 | Zimmer et al. . |
| 4,146,573 | 3/1979 | Kane . |
| 4,169,824 | 10/1979 | Kane . |
| 4,464,479 | 8/1984 | Ritter et al. . |
| 4,810,682 | 3/1989 | Andrews . |
| 4,994,244 | 2/1991 | Fulford et al. . |
| 5,030,424 | 7/1991 | Fulford et al. . |
| 5,043,077 | 8/1991 | Chandler et al. ........................ 210/698 |
| 5,053,144 | 10/1991 | Szirmai et al. ......................... 210/770 |
| 5,534,235 | 7/1996 | Reed et al. .............................. 210/732 |
| 5,540,846 | 7/1996 | Koch et al. ............................. 210/398 |
| 5,607,598 | 3/1997 | Withims .................................. 210/772 |
| 5,707,512 | 1/1998 | Koch et al. ............................. 210/398 |

*Primary Examiner*—Robert J. Popovics
*Attorney, Agent, or Firm*—Roylance, Abrams, Berdo & Goodman, L.L.P.

[57] ABSTRACT

The invention covers a process for dehydration/filtration, and washing of red mud, if applicable with addition of sand, particularly from the Bayer process for aluminum production from bauxite, in which filters are used and caustic is washed out on the filter. The invention is basically characterized by washing and dehydration being effected under pressure above atmospheric with regeneration of bound caustic and production of a residue with a high solids concentration. In addition, the invention covers a plant for the implementation of the process.

18 Claims, 6 Drawing Sheets

RED MUD DEWATERING AND WASHING PROCESS

FIELD OF THE INVENTION

The invention covers a process for filtration and washing of red mud, if applicable with addition of sand, in particular from the Bayer process for aluminum production from bauxite, in which filters are used and caustic is washed out on the filter.

BACKGROUND OF THE INVENTION

Alumina (aluminum oxide $Al_2O_3$) is generally obtained by caustic leaching of bauxite, the so-called Bayer process, as an intermediate product in the electrolytic production of aluminum. Red mud, the residue of the Bayer process, must be disposed of in considerable quantities. Red mud removal is one of the major technical and economic problems of the Bayer process. Most of the timer the closed circuit is operated with a supersaturated alumina solution at elevated caustic concentrations and temperatures. The solid and finely divided red mud must be separated from this circuit and washed out. During this process, concentration and temperature of the liquor are reduced, producing undesired sedimentation of alumina. This alumina, as well as the liquid containing caustic and additional quantities of alumina disposed of together with the red mud, account for a considerable loss which, however, can be reduced by suitable process parameter control. The lower the quantity and concentration of the residual moisture can be kept in the red mud, the lower the losses. A limited quantity of washing water can be used for recycling and/or washing out of these valuable substances. Any excess of water used, however, requires additional evaporation and evaporation capacity.

Current processes particularly rely on counter current decantation (CCD). Settlers are used for separation, thickening and washing out of red mud. The subsequent counter current decantation (CCD) consists of a series of washing stages. Usually, 5 to 7 stages, each one with 2 or more washers of at least 30 meters diameter, are used for the usual alumina capacities in the range of 1 million tons per year. Usually, these procedures require 3 to 5 $m^3$ of water per ton of dry mud, exceeding the operational demand by 1 to 4 $m^3$ per ton. Subsequently, the red mud is pumped into basins or lagoons, which are sometimes several miles away from the plant. Without any further treatment, the mud will finally dry to a solids concentration of 50%.

Frequently, dram filters for red mud separation by filtration are used as an alternative or supplement to counter current decantation. Vacuum filtration is performed after 3 to 4 washing stages, permitting a residual moisture of 45% with a washing water requirement of 2 to 3 $m^3$ per ton of dried mud. In this process too, pumps, particularly high-pressure pumps for thick sludge, are used to pump the mud to a disposal pond where a final solids concentration after drying of up to 65% can be reached.

These technologies for the removal of red mud have a number of disadvantages or inconveniences. Sodalite, a sodium aluminum silicate, leaves the circuit in a solid phase with the red mud, constituting a great loss of chemicals, i. e. of caustic and alumina, which has a major effect on the production costs. Furthermore, plant efficiency is affected by separation of red mud in relatively large equipment and the resulting elevated holding time. Temperature and caustic concentration are reduced which leads to a reduction of liquor stability, resulting in a considerable and undesired loss of dissolved alumina; this, in turn, affects plant productivity and consequently the overall costs. This loss of soluble alumina may affect the supersaturation of process streams and, in consequence, the liquor and plant productivity, thus increasing the specific fixed costs. The final solids concentration of the red mud to be disposed of is still insufficient with 0.8 $m^3$ to 1.5 $m^3$ of liquor per ton of dry mud being wasted. Although the suspension has been diluted by the washing water in counter current, considerable quantities of soluble caustic and alumina are disposed of as waste into the red mud ponds. The excess water used for washing requires additional steam and evaporating capacity in order to maintain temperature and concentration in the circuit, thus increasing production and capital costs. At a solids concentration of 30 to 55%, the red mud remains in a thixotropic range with a large quantity of free caustic, which poses serious handling and storage problems.

None of the known technologies has been able to solve the problem of solid phase losses resulting from the reactive silica content in bauxite.

SUMMARY OF THE INVENTION

The purpose of the present invention is to avoid the above-mentioned disadvantages and inconveniences; it is particularly intended to reduce the solid phase (bound-form) losses of caustic and alumina, and to produce non-thixotropic mud for clean and economical disposal. Whithin the scope of the invention described herein, this problem is solved by washing and filtration under pressure above atmospheric. Washing can be done with hot water and/or steam. During pressurized washing and filtration, particularly by means of hot water and/or steam, the valuable substances bound in the solid (mud/waste) are dissolved and washed out. This results in particular in a low caustic soda lye consumption, thanks to increased liquor recovery and/or regeneration, and—depending on the operating conditions—in a lower alumina loss. At the same time, the ecological compatibility of the red mud to be disposed of is improved by reducing the quantity of liquid and caustic contained in it, and by removing thixotropic mud characteristics.

Another advantageous feature of the invention is characterized by washing and filtration taking place at pressures between 2 and 8 bars, in particular at 4 to 5 bars. Working under high pressure permits use of hot water at temperatures far above 100° C. which has a favorable effect on the washing process.

An advantageous feature of the invention is characterized by washing taking place with thin red mud layers between 1 mm and 10 mm, preferably between 3 mm and 6 mm. This permits particularly efficient washing of the entire quantity of red mud.

An advantageous further embodiment of the invention is characterized by the filter speed ranging between 0.1 and 3 revolutions per minute, preferably between 1 and 2 revolutions per minute.

A particularly advantageous feature of the invention is characterized by filtration of the red mud to a residual moisture of 15 to 35 weight %, in particular 20 to 25 weight %. In this range, the resulting filter cake does not show thixotropic behavior any more, i.e. no further separation of solids and liquid (acid), for instance during transport and/or storage, is to be expected.

Another advantageous feature of the invention is characterized by the washing of the red mud being done with a water quantity above 0.5 $m^3$, preferably above 1.0 $m^3$ per ton of dry mud.

In addition, the invention covers a plant for dehydration/ filtration and washing of red mud by means of a filter, in particular for carrying out the process. It is characterized particularly by the fact that the filter is used in a pressure chamber.

An advantageous further development of the invention is characterized by a rotary filter, i.e. a disk filter, being used for filtration.

An advantageous embodiment of the invention is characterized by the pressure chamber being equipped with an additional steam cone above the filter.

BRIEF DESCRIPTION OF THE DRAWINGS

An advantageous feature of the invention is characterized by a distribution system being provided which ensures that washing water is distributed over the filter surface; when using a disk filter, the distribution system can be placed on both sides of the filter disk(s) covering the major part of the filter surface in radial direction.

In the following, the invention is described on the basis of the drawings.

DETAILED DESCRIPTION OF THE INVENTION

Figure 1A:
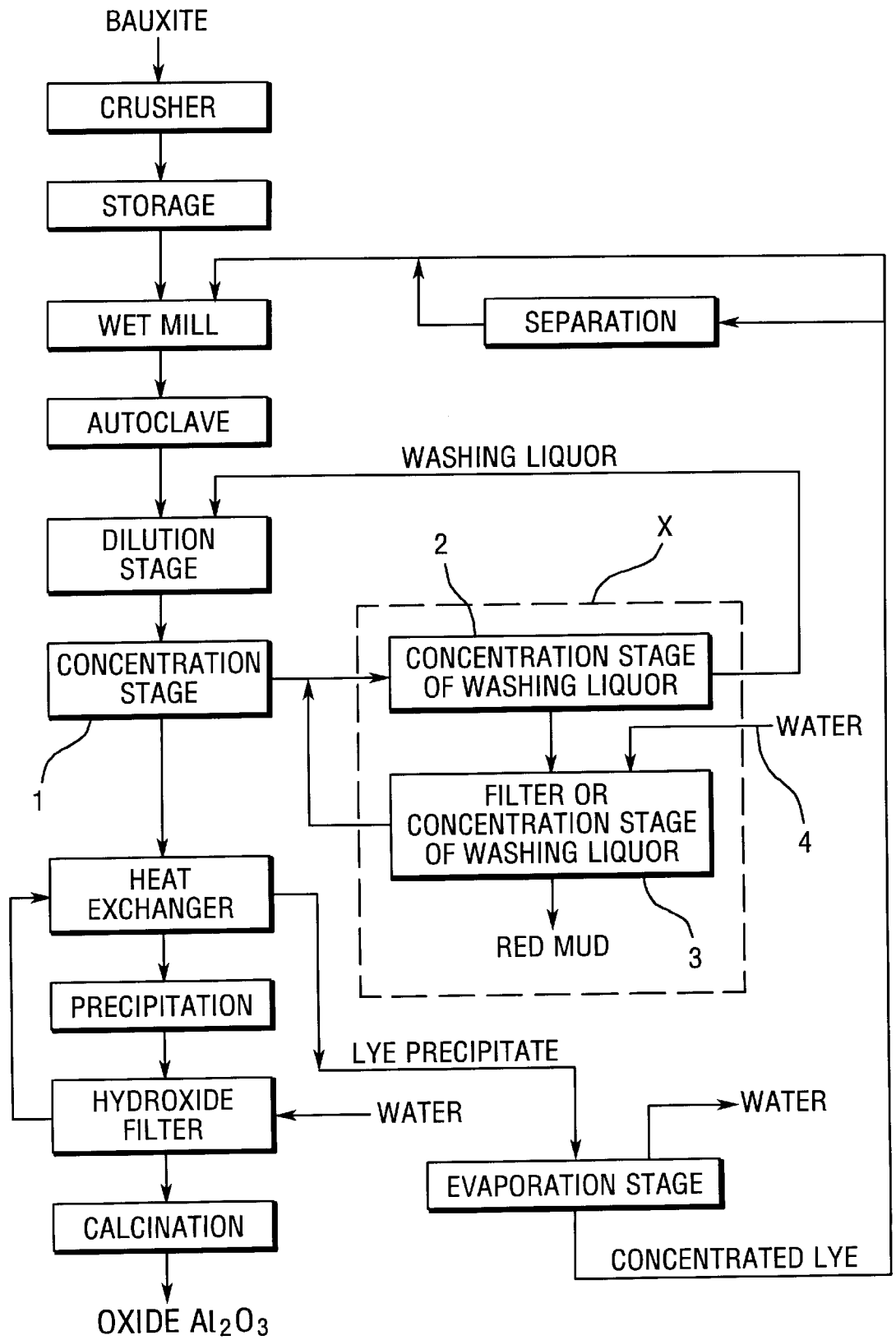
FIG. 1a is the flow chart of one version of the Bayer process.

FIG. 1a shows a flow diagram of aluminum oxide (alumina) production from bauxite according to the Bayer process. In settler 1, the red mud is separated from the process, passes a series of washing settlers 2 (according to technical and economic requirements) onto filter 3. During the filtration process, water 4 is added for washing out and, subsequently, the red mud 5 is pumped to a dump or into a sedimentation pond.

Figure 1B:
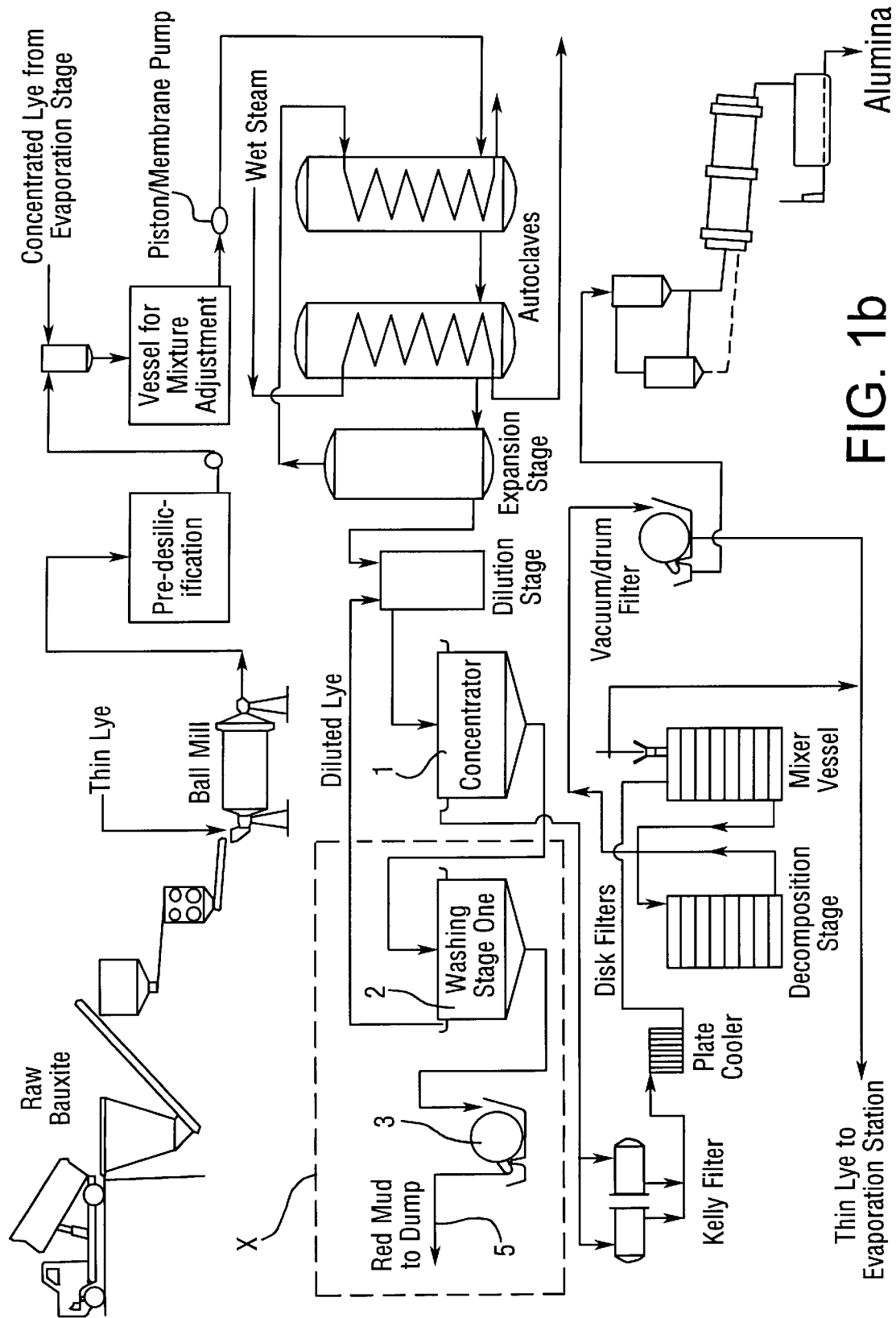
FIG. 1b shows the equipment diagram, of this version of the Bayer process as implemented.

FIG. 1b shows the equipment diagram corresponding to FIG. 1a in which, parting from settler 1, the red mud is passed onto a counter current washing system. After being properly washed in a varying number of washing stages (usually 3 to 4), the red mud is filtered by means of vacuum drum filters 3, washed, and subsequently the thickened red mud 5 is pumped onto the dump.

In FIGS. 1a and 1b, the process flow described below and improved by the present invention is shown by a broken-line frame marked X.

Figure 2:
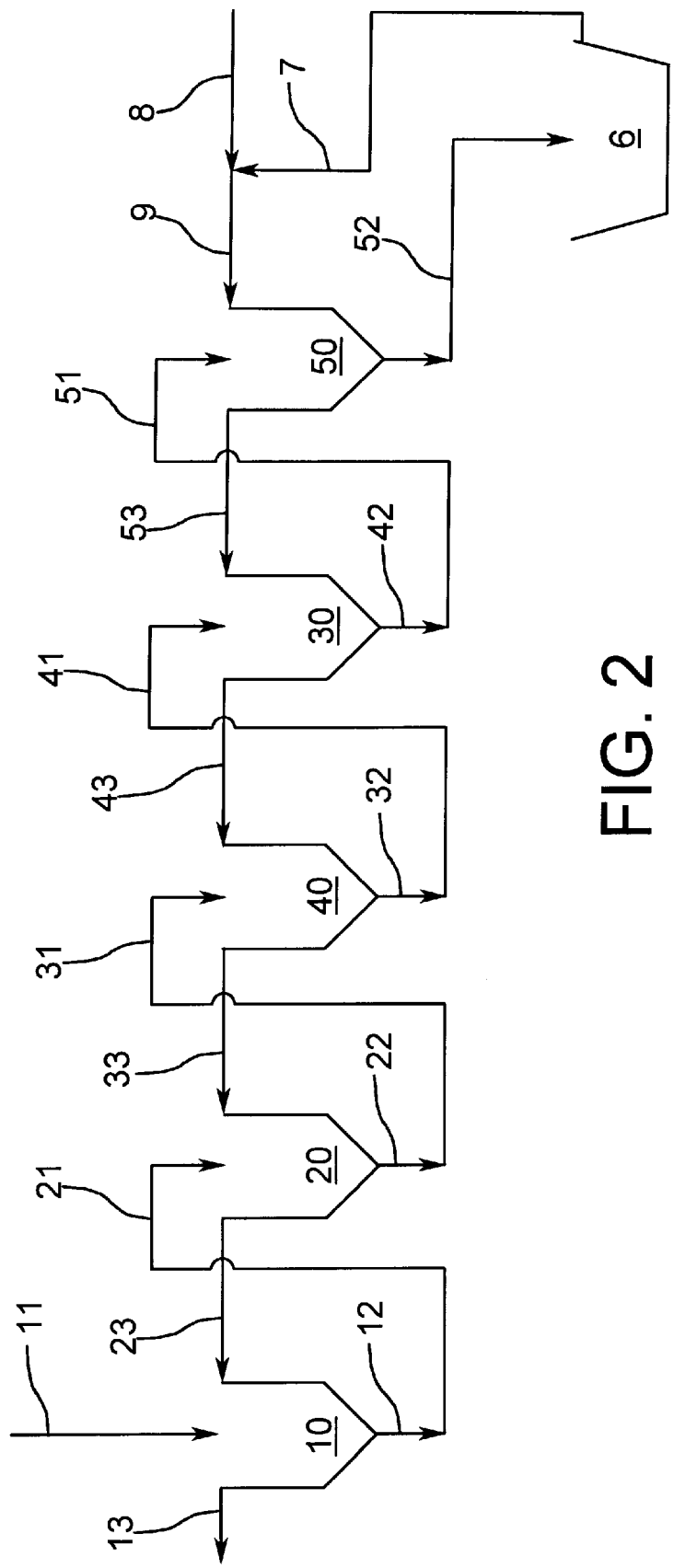
FIG. 2 shows a typical version of state-of-the-art counter current decantation.

FIG. 2 shows a typical standard solution for counter current decantation with 5 washing stages. The quantities and concentrations of the individual substance flows have been listed in table 1; these are approximate values at a theoretical efficiency of 100%. The pre-thickened red mud suspension is passed to the first washing settler 10 through pipe 11. The settler underflow is subsequently passed onto the next washing settler 20. The overflow 23 of washing settler 20 is added to the feed 11 upstream of the entry to washing stage 10 for further washing out. The overflow 13 of the washing settler 10 is subsequently returned to the circuit. The further washing stages are of analogous design. The, underflow 52 of the washing settler 50 is discharged and pumped onto a dump or a sedimentation pond 6. After another settling process, a low quantity of caustic soda lye 7 is recycled from the sedimentation pond 6, topped up with fresh water 8 and passed onto washing stage 50 for washing out via a pipe 9. The red mud in the sedimentation pond has now a solids concentration of approximately 55% and a residual caustic concentration of approximately 1.3%, the latter constituting a loss to the circuit since expensive fresh caustic must be added to the circuit elsewhere.

Figure 3:
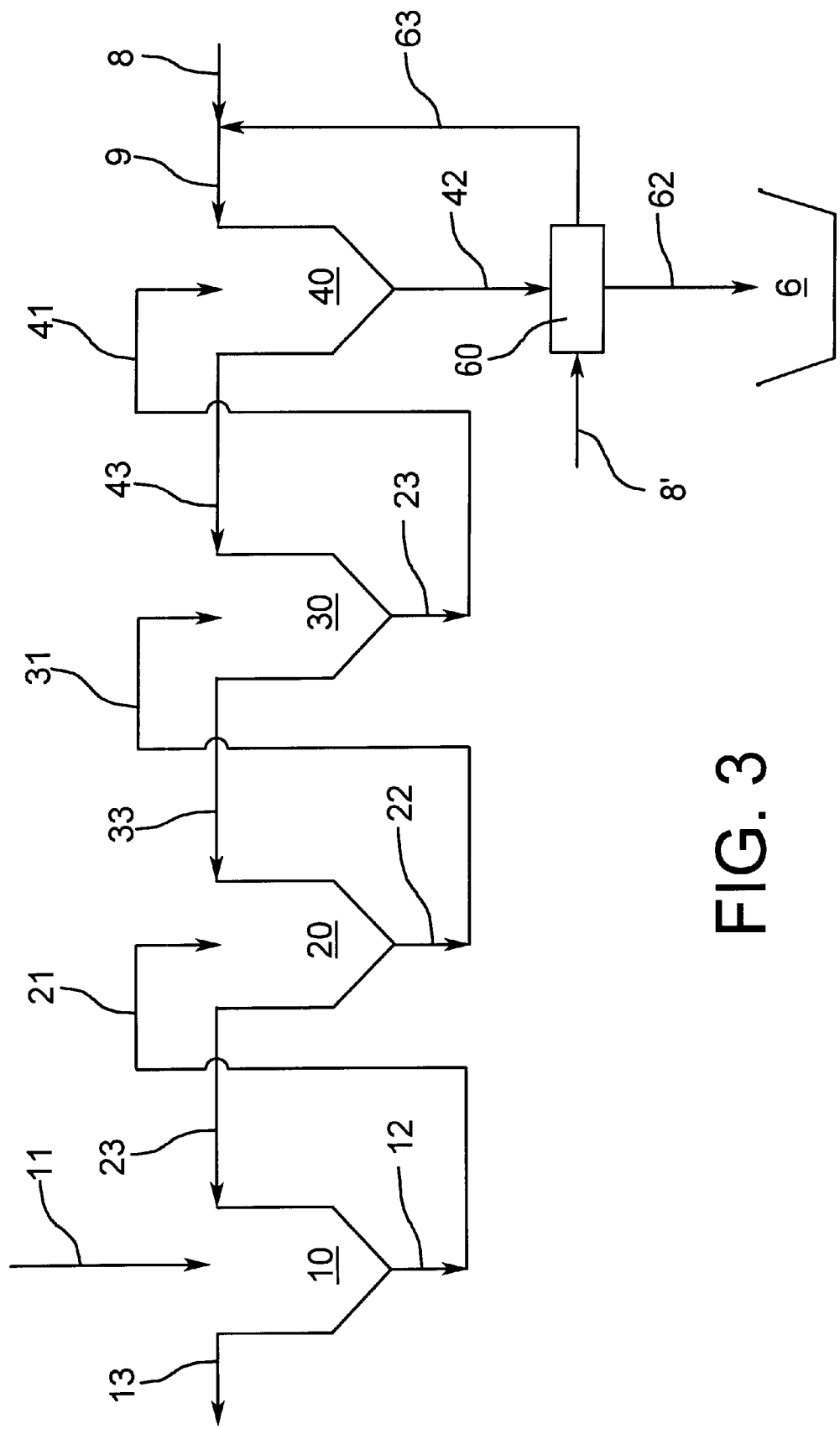
FIG. 3 shows a version according to the invention.

FIG. 3 shows the process according to the invention. In analogy to FIG. 2, there are several washing stages. However, in this process only 4 stages are needed. The underflow 42 of the washing settler 40 is passed onto a so-called pressure filter 60. For washing out, in addition, hot water 8 is fed to this pressure filter 60. As an alternative, steam can be fed to the filter. The filter cake 62 of the pressure filter 60 contains approximately 75% solids and only approximately 1% of caustic soda lye which is lost and discharged into a sedimentation pond 6. The pressure filter filtrate 63 is mixed with fresh water 8 and fed onto to the fourth washing stage 40 for washing out via a pipe 9. This process permits to increase the solids concentration from approximately 55% to approximately 75% and to reduce the caustic soda lye loss to approximately one tenth of the prior loss. The caustic soda lye washed out additionally is returned to the circuit in the filtrate 63 and via the washing stages 10, 20, 30, 40.

Figure 4:
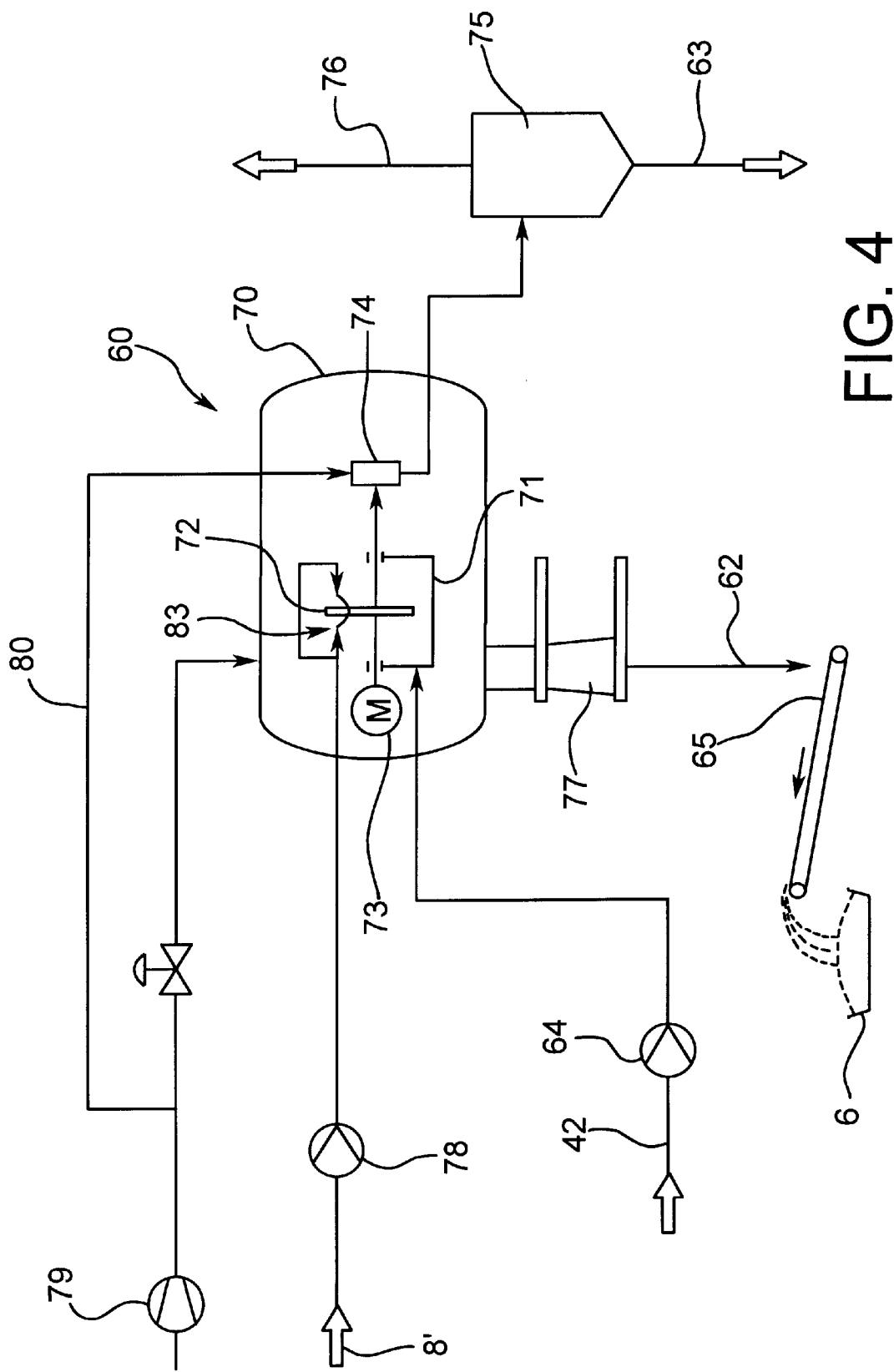
FIG. 4 shows one plant version.

FIG. 4 shows details of the part of the plant that concerns the pressure filter. The pressure filter 60 consists of a pressure vessel 70, with a filter composed of a filter trough 71, filter disks 72, a motor 73, and a control head 74 located within the pressure chamber of the pressure vessel 70. In alternative versions, several filter disks mounted onto the shaft or a filter drum can be used instead of the single filter disk.

The underflow 42 of the washer 40 is passed into the tough 71 of the pressure filter 60 by means of a pump 64 where continuous cake formation takes place and subsequently, during the dehumidification phase, the filter cake formed from the suspension is washed. For this purpose, fresh water 8 is conveyed by means of a pump 78 and fed to the filter disks or the filter drum through a suitable distribution system 83. The filtrate is passed via a control head 74 into a filtrate separator 75 where the exhaust air 76 is separated from the filtrate enriched with caustic soda lye 63. In this process, the filtrate from the cake formation and the filtrate from the washing and/or dehumidification zone can be removed separately. The solids are removed from the filter and passed onto a dump 6 through a discharge lock 77 by means of suitable conveying equipment 65. Depending on the residual moisture of the filter cake, conventional conveyor systems such as conveyor belts or a pump for thick sludge can be used. The operating pressure required in the pressure vessel 70 for cake formation and dehumidification is produced by introducing air into the pressure vessel 70 by means of a compressor 79. Furthermore, a small quantity of air at a slightly higher pressure is passed into the control head 74 and from there into the filter disk 72 or the filter drum in order to separate and drop the filter cake from the filter medium.

Figure 5:
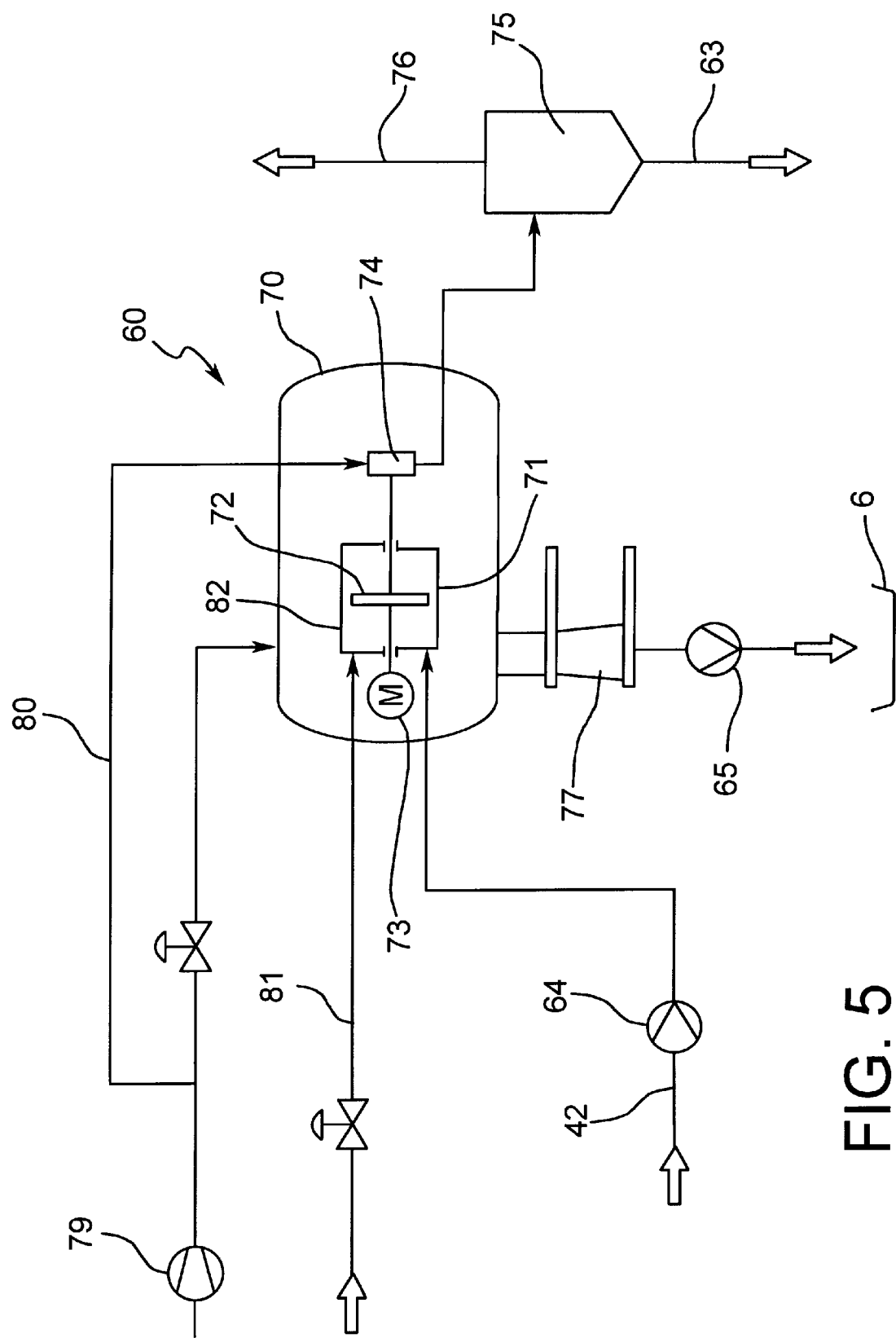
FIG. 5 another plant version according to the invention.

FIG. 5 shows a similar plant in which steam is used instead of hot water for washing out the caustic soda lye from the red mud. For this purpose, a steam cone 82 is installed above the filter disk 72 and above the filter trough 71. Steam is introduced into the cone through pipe 81.

The drawings show the features of the invention only by way of example. It would be a conceivable alternative, e.g., to produce the pressure in the pressure vessel 70 by pure steam which would make it possible to dispense with the compressed air feed and the pressure cone. Pressure filtration without washing stages, or with two stages only, or with addition of sand are further alternative applications. The use of a belt filter in the pressure vessel is another possible alternative.

TABLE 1

Standard CCD

| Position | Location | Caustic conc. g Na20/l | Solids conc. g/l |
|---|---|---|---|
| 10 | Washer I | 90 | 400 |
| 11 | Feed | 130 | 450 |
| 12 | Underflow washer I | 90 | 400 |
| 13 | Overflow washer I | 90 | 0 |
| 20 | Washer II | 60 | 400 |
| 21 | Feed washer II | 90 | 400 |
| 22 | Underflow washer II | 60 | 400 |
| 23 | Overflow washer II | 60 | 0 |
| 30 | Washer III | 40 | 400 |
| 31 | Feed washer III | 60 | 400 |
| 32 | Underflow washer III | 40 | 400 |
| 33 | Overflow washer III | 40 | 0 |
| 40 | Washer IV | 20 | 400 |
| 41 | Feed washer IV | 40 | 400 |
| 42 | Underflow washer IV | 20 | 400 |
| 43 | Overflow washer IV | 20 | 0 |
| 50 | Washer V | 10 | 400 |
| 51 | Feed washer V | 20 | 400 |
| 52 | Underflow washer V | 10 | 400 |
| 53 | Overflow washer V | 10 | 0 |
| 6 | Sedimentation pond | 16 | 900 |
| 7 | Filtrate return from sedimentation pond | 10 | 0 |
| 8 | Fresh water | 0 | 0 |
| 9 | Washing water feed | 3.6 | 0 |

TABLE 2

Pressure Filter tip

| Position | Location | Caustic conc. g Na20/l | Solids conc. g/l |
|---|---|---|---|
| 10 | Washer I | 70 | 400 |
| 11 | Feed | 130 | 450 |
| 12 | Underflow washer I | 70 | 400 |
| 13 | Overflow washer I | 70 | 0 |
| 20 | Washer II | 40 | 400 |
| 21 | Feed washer II | 70 | 400 |
| 22 | Underflow washer II | 40 | 400 |
| 23 | Overflow washer II | 40 | 0 |
| 30 | Washer III | 25 | 400 |
| 31 | Feed washer III | 40 | 400 |
| 32 | Underflow washer III | 25 | 400 |
| 33 | Overflow washer III | 25 | 0 |
| 40 | Washer IV | 10 | 400 |
| 41 | Feed washer IV | 25 | 400 |
| 42 | Underflow washer IV | 10 | 400 |
| 60 | Pressure filter | 9 | 400 |
| 62 | Filter cake | 3 | 1500 |
| 63 | Filtrate | 9 | 0 |
| 8 | Fresh water | 0 | 0 |
| 8 | Fresh water Pressure filter | 0 | 0 |
| 9 | Washing water feed Washer IV | 3 | 0 |

We claim:

1. A process for treating and disposing of red mud generated in a Bayer process, said process comprising the steps of:

feeding said red mud to a filter trough enclosed within a pressure vessel and subjecting said red mud to a pressure above atmospheric pressure while in said trough, passing a filter surface through said red mud in said filter trough while under said pressure to recover a filter cake of red mud on said filter surface, directing a stream of washing fluid through said filter cake on said filter surface while under said pressure to wash caustic soda and alumina compounds from said filter cake and to produce a washed dewatered filter cake, recovering said washing fluid from said filter cake and filter surface, said washing fluid containing solubilized caustic soda and alumina compounds, and discharging said washed filter cake from said filter surface and said pressure vessel.

2. The process of claim 1, wherein said washing fluid is hot water at a temperature above about 80° C.

3. The process of claim 1, wherein said washing fluid is hot water at a temperature of at least about 100° C.

4. The process of claim 1, wherein said washing fluid is steam.

5. The process of claim 1, wherein said washing fluid is saturated steam.

6. The process of claim 1, wherein said pressure vessel is maintained at an operating pressure of about 2 to about 8 bar.

7. The process of claim 1, wherein said pressure vessel is maintained at an operating pressure of about 4 to 5 bar.

8. The process of claim 1, wherein said filter cake is a thin layer of about 1 mm to 10 mm.

9. The process of claim 1, wherein said filter cake is a layer of about 3 mm to about 6 mm.

10. The process of claim 1, wherein said filter surface is a rotary filter, said process comprising rotating said rotary filter at a speed of about 0.1 to 3 rpm.

11. The process of claim 1, wherein said filter surface is a rotary filter and said process comprises rotating said rotary filter at a speed of about 1 to 2 rpm.

12. The process of claim 1, comprising recovering said washing fluid from said filter cake to produce a filter cake having a moisture content of about 15% to 35% by weight based on the weight of the filter cake.

13. The process of claim 1, comprising recovering said washing fluid from said filter cake to produce a filter cake having a moisture content of about 20% to about 25% by weight based on the weight of the filter cake.

14. The process of claim 1, comprising washing said filter cake with said washing fluid in an amount of at least 0.5 m$^3$ per ton of dry red mud.

15. The process of claim 1, comprising washing said filter cake with said washing fluid in an amount of at least about 1 m$^3$ per ton of dry red mud.

16. The process of claim 1, wherein said filter trough includes a dome enclosing said filter surface and contained within said pressure vessel, said process comprising injecting steam into said dome to contact said filter cake.

17. The process of claim 1, comprising directing said stream of washing fluid substantially across a width of said filter surface and said filter cake.

18. The process of claim 1, wherein said filter surface is a disk filter having a first and second side, said process comprising directing said washing fluid onto said first and second sides.

* * * * *